(12) United States Patent
Shieh et al.

(10) Patent No.: US 8,984,114 B2
(45) Date of Patent: Mar. 17, 2015

(54) DYNAMIC SESSION MIGRATION BETWEEN NETWORK SECURITY GATEWAYS

(71) Applicant: Varmour Networks, Inc., Santa Clara, CA (US)

(72) Inventors: Choung-Yaw Michael Shieh, Palo Alto, CA (US); Meng Xu, Los Altos, CA (US); Yi Sun, San Jose, CA (US)

(73) Assignee: Varmour Networks, Inc., Santa Clara, CA (US)

( * ) Notice: Subject to any disclaimer, the term of this patent is extended or adjusted under 35 U.S.C. 154(b) by 96 days.

(21) Appl. No.: 13/645,238

(22) Filed: Oct. 4, 2012

(65) Prior Publication Data

US 2013/0091264 A1    Apr. 11, 2013

Related U.S. Application Data

(60) Provisional application No. 61/627,252, filed on Oct. 6, 2011.

(51) Int. Cl.
*G06F 15/16* (2006.01)
*H04L 29/06* (2006.01)

(52) U.S. Cl.
CPC ..................... *H04L 63/20* (2013.01)
USPC ............. 709/223; 709/230; 370/338

(58) Field of Classification Search
CPC . H04L 63/0428; H04L 63/10; H04L 67/2819; G06F 15/16; G06F 9/45533
USPC .......... 709/223, 230; 726/7; 370/338
See application file for complete search history.

(56) References Cited

U.S. PATENT DOCUMENTS

| 7,542,455 | B2 * | 6/2009 | Grayson et al. | 370/338 |
|---|---|---|---|---|
| 7,986,938 | B1 * | 7/2011 | Meenan et al. | 455/410 |
| 2003/0177389 | A1 * | 9/2003 | Albert et al. | 713/201 |
| 2003/0236985 | A1 * | 12/2003 | Ruuth | 713/173 |
| 2004/0172618 | A1 * | 9/2004 | Marvin | 717/116 |
| 2004/0214576 | A1 * | 10/2004 | Myers et al. | 455/445 |
| 2005/0114288 | A1 * | 5/2005 | Dettinger et al. | 707/1 |
| 2006/0150250 | A1 * | 7/2006 | Lee et al. | 726/23 |
| 2008/0222375 | A1 * | 9/2008 | Kotsovinos et al. | 711/162 |
| 2009/0228966 | A1 * | 9/2009 | Parfene et al. | 726/7 |
| 2010/0104094 | A1 * | 4/2010 | Takashima | 380/28 |
| 2011/0010515 | A1 * | 1/2011 | Ranade | 711/162 |
| 2011/0013776 | A1 * | 1/2011 | McAlister | 380/283 |
| 2012/0036567 | A1 * | 2/2012 | Senese et al. | 726/7 |

\* cited by examiner

*Primary Examiner* — Tesfay Yohannes
(74) *Attorney, Agent, or Firm* — Blakely, Sokoloff, Taylor & Zafman LLP

(57) ABSTRACT

A method and apparatus is disclosed herein for migrating session information between security gateways are disclosed. In one embodiment, receiving, at a first security gateway, session information associated with a session corresponding to a network connection, the session information having been transferred from a second security gateway, the first and second security gateway being separate physical devices; and thereafter performing security processing for the session at the first security gateway.

20 Claims, 6 Drawing Sheets

DYNAMIC SESSION MIGRATION BETWEEN NETWORK SECURITY GATEWAYS

PRIORITY

The present patent application claims priority to and incorporates by reference the corresponding provisional patent application Ser. No. 61/627,252, titled "Dynamic Session Migration between Network Security Gateways," filed on Oct. 6, 2011.

FIELD OF THE INVENTION

Embodiments of the present invention related to network security. More particularly, embodiments of the present invention relate to migrating session information from one network security gateway to another gateway.

BACKGROUND OF THE INVENTION

As enterprises support more and more servers and virtual machines in their networks, there is an increasing need for the scalability of network security gateways. Traditional network security gateways process all packets using hardware within a single physical chassis. While this implementation allows for an easier implementation, it puts sever limits on how network administrators utilize their networks. All the traffic that requires security inspection must be forwarded to the centralized physical chassis or hardware for processing, and then be sent back, thereby increasing transport latency and management complexity. There are some implementations using multiple, yet independent, hardware to process network security, but these implementations keeps state information on each hardware separate from each other, which prevents its use in many scenarios that require all the state information to be centrally located or assessable.

In the prior art, the security gateways typically run independently. If a host or virtual machine moves to a different location where is behind a different security gateway, the session information of current connections are lost and the security processing is interrupted. The interruption may cause security vulnerability or down time of the connection.

Some security gateways implement session synchronization between two or more gateways for redundancy purposes to support high availability. The session synchronization process repeatedly copies the session information to the gateways being synchronized. The gateways receiving the session information keep the session information as a passive backup, and only use the session information when the fail-over is needed. This mechanism requires the synchronization applies to all connections throughout the life cycle of the connections. If fail over never occurs, the session synchronization process wastes bandwidth and storage since the backup is not used for packet processing. If the number of session gateways is large, then the use of session synchronization is not practical for dynamic session migration since the size of memory and bandwidth used for storing the backup becomes too large.

SUMMARY OF THE INVENTION

A method and apparatus is disclosed herein for migrating session information between security gateways are disclosed. In one embodiment, the method comprises receiving, at a first security gateway, session information associated with a session corresponding to a network connection, the session information having been transferred from a second security gateway, the first and second security gateway being separate physical devices; and thereafter performing security processing for the session at the first security gateway.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
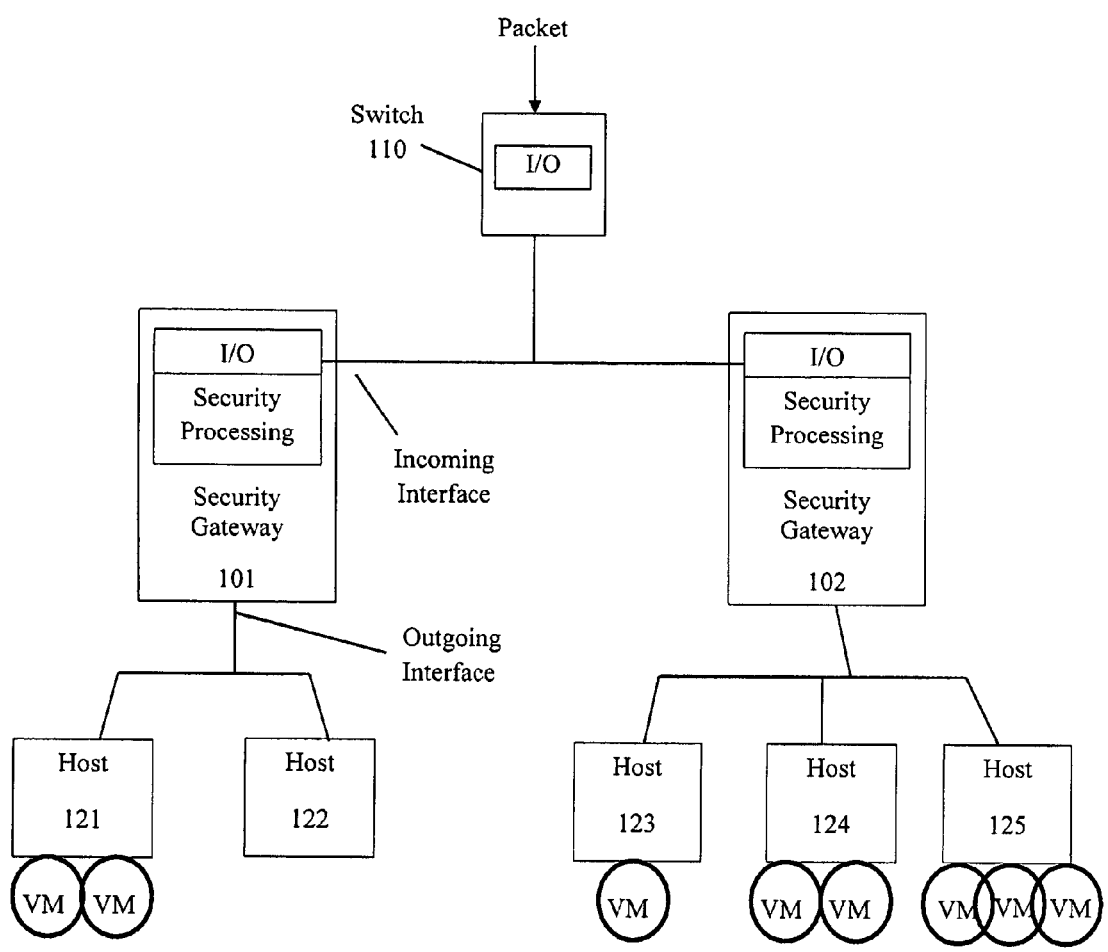
FIG. 1 is a block diagram of one embodiment of a network having two network security gateways and their prospective protected hosts.

Embodiments of the present invention dynamically forward and transfer session information (e.g., state information) of each session from one security gateway to another security gateway. The transfer of session information enables the remote gateway to take over security processing of an existing session from another gateway (e.g., a local security gateway) at run-time. In other words, the transfer of session information allows network security processing to be freely transferred to a different processing unit. This is very useful when network administrators want to distribute the processing loading to another gateway, or move the processing gateway closer to the hosts it protects to increase network efficiency and performance. Thus, by dynamically migrating session information between security gateways, security processing of packets may be moved freely around networks to optimize the system workload and bandwidth utilization.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a block diagram of one embodiment of a network having multiple network security gateways and their prospective protected hosts (one or more networks). Referring to FIG. 1, security gateways 101 and 102 are communicably coupled to switch 110. In one embodiment, switch 110 is coupled to a network (e.g., a wide area network, local area network, etc.), which is not shown to avoid obscuring the present invention. Security gateway 101 is coupled to hosts (e.g., servers) 121 and 122, while security gateway 102 is coupled to hosts (e.g., servers) 123-125. Note that there may be more or less hosts coupled to each of security gateways 101 and 102.

When either security gateway 101 or 102 receives a packet of a new connection, it creates a session and records the state information in the session for the life of the connection. The session information includes all run-time states and metadata about the connection and are used to apply the security policy to the connection. In one embodiment, the session information includes a source IP address, destination IP address, port number, source port indication, and destination port indication. In one embodiment, the session information also includes information indicating the incoming interface/port (upon which packet a session is recorded), information indicating the outgoing interface/port (upon which a packet is sent after performing security processing has been applied to it), TCP sequence number, and routing domain. In one embodiment, the run-time state information includes application type information (e.g., Facebook, bitTorrent, Skype, or Dropbox).

In the event that security processing must be moved from one gateway to another gateway, including but not limiting to, virtual machine migration or interface failure, the present invention migrates the associated session state information to another security gateway. For example, if one of the virtual machines associated with host 121 is moved to host 123, then the session information associated with a session for which security processing is being performed by that virtual machine may be moved from host 121 to host 123 so that the security processing may be performed at host 123. This provides great benefit of reduce networks down time and increase application performance.

In one embodiment, the session information may be migrated using "in line" session migration. In one embodiment, the migration of session information from one gateway to another gateway is performed by including the current session information in the packets when forwarding the packets to the new gateway. In one embodiment, this is performed by either prepending or appending the session information to the payload of packets. In another embodiment, this is performed by encapsulating the session information and the packet together with a new protocol header. Other methods can be used to send the session information along with the packet to the other gateway together.

When the security gateway to which the session information is being sent (i.e., the receiving gateway) receives the packets along the session information, it retrieves current session states and installs the session. In one embodiment, the receiving gateway notifies the gateway that sent the session information (i.e., the sending gateway) by piggyback the confirmation on the reply packets. In another embodiment, the receiving gateway notifies the sending gateway by using other out of band methods.

Once the sending gateway receives the confirmation, the session migration is completed and now the receiving gateway takes over management of the session.

Figure 2:
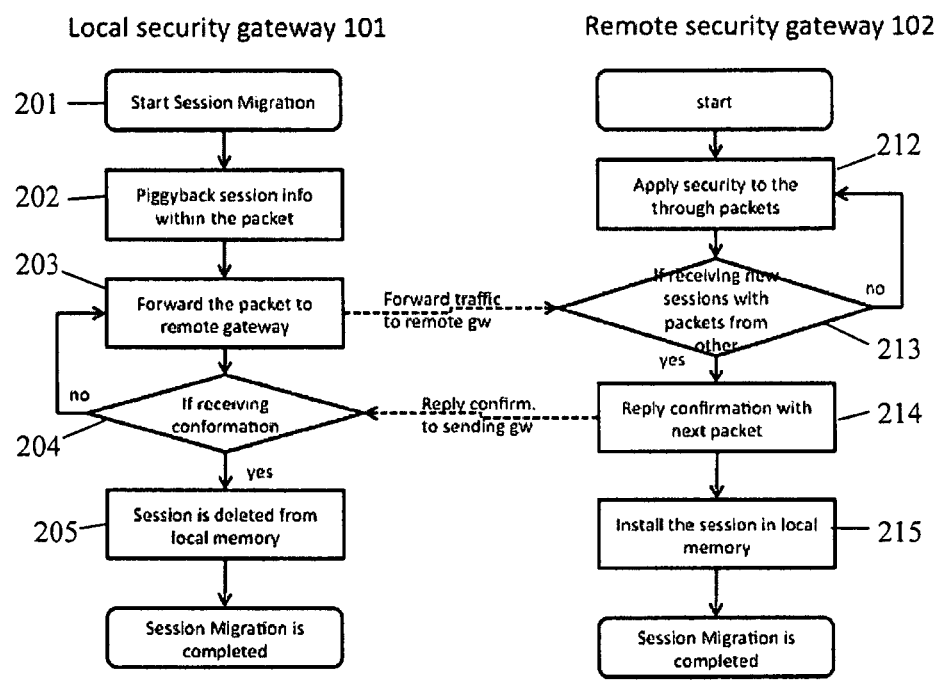
FIG. 2 is a flow diagram of one embodiment of a process for forwarding session information to remote security gateways.

FIG. 2 is a flow diagram of one embodiment of a process for forwarding session information to remote security gateways. The process is performed by processing logic that may comprise hardware (circuitry, dedicated logic, etc.), software (such as is run on a general purpose computer system or a dedicated machine), or a combination of both. In one embodiment, the processing logic is part of security gateways.

Referring to FIG. 2, local security gateway 101 starts performing session migration (processing block 201) and prepends or appends session information within a packet of the session (processing block 202). While this is occurring, remote security gateway 102 applies security to the through packets (processing block 212).

After adding the session information to the packet, security gateway 101 forwards the packet to security gateway 102 (processing block 203). Security gateway 102 receives the packet and tests whether its receiving a new session from another gateway (processing block 213). If it isn't, the process being performed by security gateway 102 transitions to processing block 212 and the process continues. If it is receiving a new session, security gateway 102 sends a reply confirmation with a new packet to security gateway 101 (processing block 214).

After forwarding the packet to security gateway 102, security gateway 101 tests whether it has received a reply confirmation from security gateway 102 (processing block 204). If not, the process being performed by security gateway 101 returns to processing block 203 and the process continues from that point. If security gateway 101 does receive the reply confirmation, the process continues at processing block 205 where security gateway 101 deletes the session from its local memory to complete the migration of the session to security gateway 102.

After sending the reply confirmation, security gateway 102 installs the session in a local memory (processing block 215) to complete the migration of the session from security gateway 101.

Figure 3:
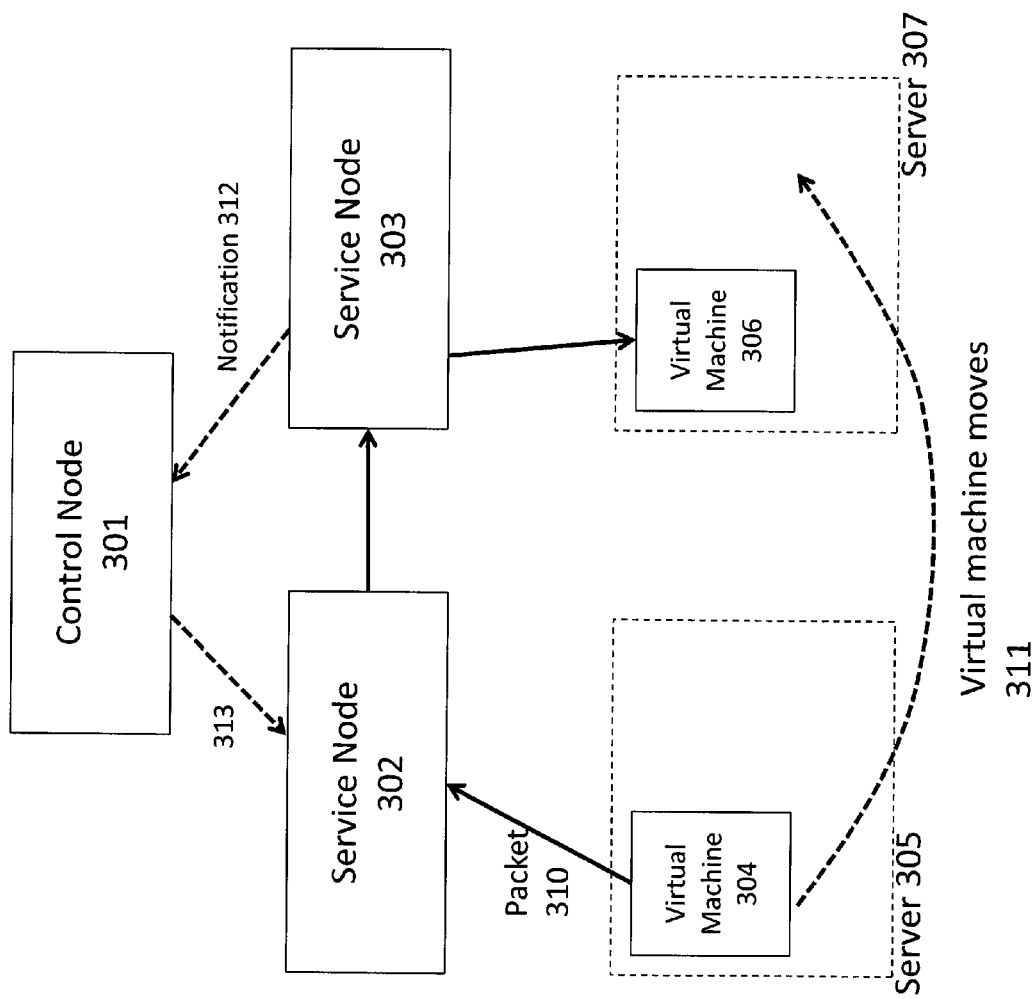
FIG. 3 illustrates the communication between various nodes.

FIG. 3 illustrates the communication between various nodes. Referring to FIG. 3, virtual machine 304 (on physical server 305) is connected to service node 302 and virtual machine 306 (on physical server 307) is connected to service node 303. A packet 310 is received by service node 302. When service node 302 has completed security processing, it forwards the packet to service node 303, or some other node (not shown) for forwarding to destination virtual machine 306. In an alternative embodiment, virtual machine 304 and 306 may be physical servers instead of virtual machines. The selection of the service node onto which the packet is sent out is based on the information of the outgoing interface for the session that is monitored by service node 302.

Control node 301 controls whether to migrate sessions between security gateways. In one embodiment, control node 301 is part of a controller external to the security gateway. However, in alternative embodiments, it may be part of one or more distributed among two or more of them. If a virtual machine 304 is moved from physical server 305 to physical server 307 (virtual machine moves 311), and its packets are sent to service node 303, then service node 303 sends a message to control node 301 indicating the current status(at 312). In response, control node 301 tells service node 302 (at 313) that a change has occurred and instructs it to do the migration.

This, the session is migrated after a move of the virtual machine between two different physical servers has occurred. In another embodiment, control node 301 may specify to where the session is to be migrated.

In one embodiment, the session migration is performed without piggyback the session information to forwarding packets. In this case, the sending gateway starts a separate connection to the receiving gateway to forward the session information, and the receiving gateway sends the confirmation back through the same connection. By transporting the session information in a different connection from the forwarding path, the impact to the performance of packet forwarding can be reduced. This method is referred to as "out of band" method.

An Example of a Network Device

In one embodiment, the security gateways or other network devices performing the session migration includes a memory, a second interface to receive one or more packets from the network or other security gateways, and a processor. In one embodiment, the processor is operable to determine if one of packets being received on the interface comprises a packet with session information contained therein or therewith and generate a reply packet to the security gateway that sent the packet with the session information. In one embodiment, the processor makes the determination by matching portions of the packet with information contained in a session information table which the security gateway uses (and may store therein). The processor could look up the layer2 or Ethernet header (such as source and destination mac address) or IP header (source ip/port, destination ip/port, protocol), or TCP/UDP header (port numbers). The processor causes the reply packet to be sent through the interface to the security gateway.

Figure 4:
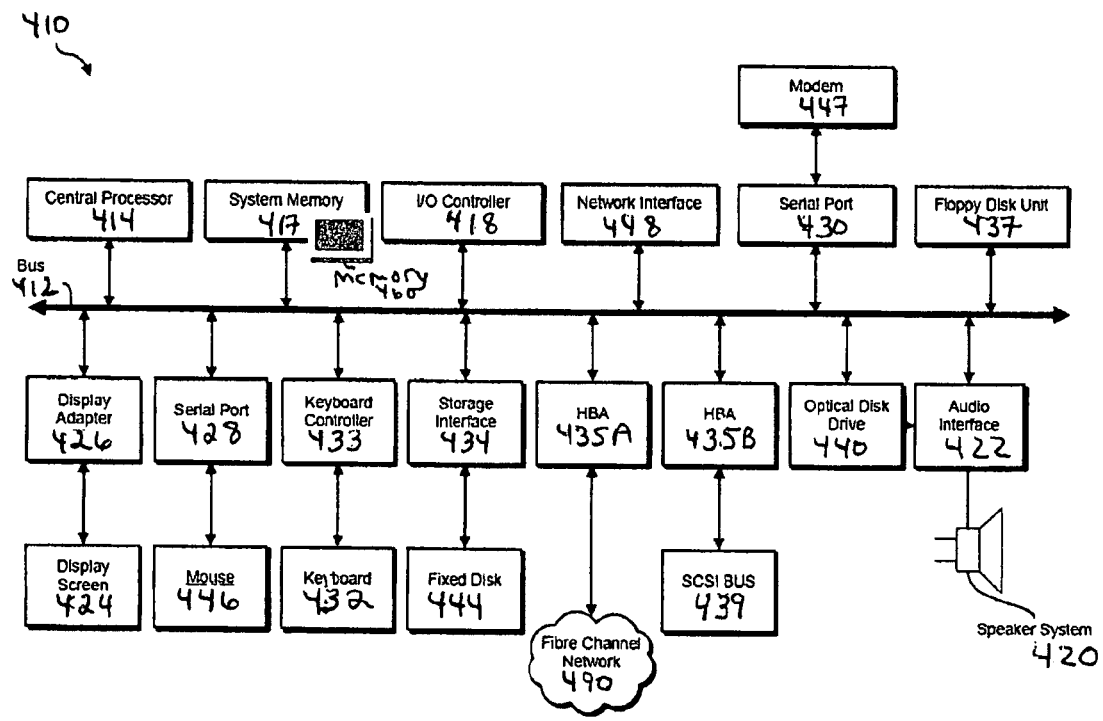
FIG. 4 depicts a block diagram of one embodiment of a security gateway.

FIG. 4 depicts a block diagram of a security gateway, such as security gateways 101 or 102 of FIG. 1. Referring to FIG. 4, security gateway 410 includes a bus 412 to interconnect subsystems of security gateway 410, such as a processor 414, a system memory 417 (e.g., RAM, ROM, etc.), an input/output controller 418, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems.

Modem 447 may provide a direct connection to a remote server via a telephone link or to the Internet via an internet service provider (ISP) (e.g., servers 101, 111-114 of FIG. 1). Network interface 448 may provide a direct connection to a remote server such as, for example, servers 111-114 of FIG. 1. Network interface 448 may provide a direct connection to a remote server (e.g., server 101 of FIG. 1) via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the security gateway operations described herein can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

Figure 5:
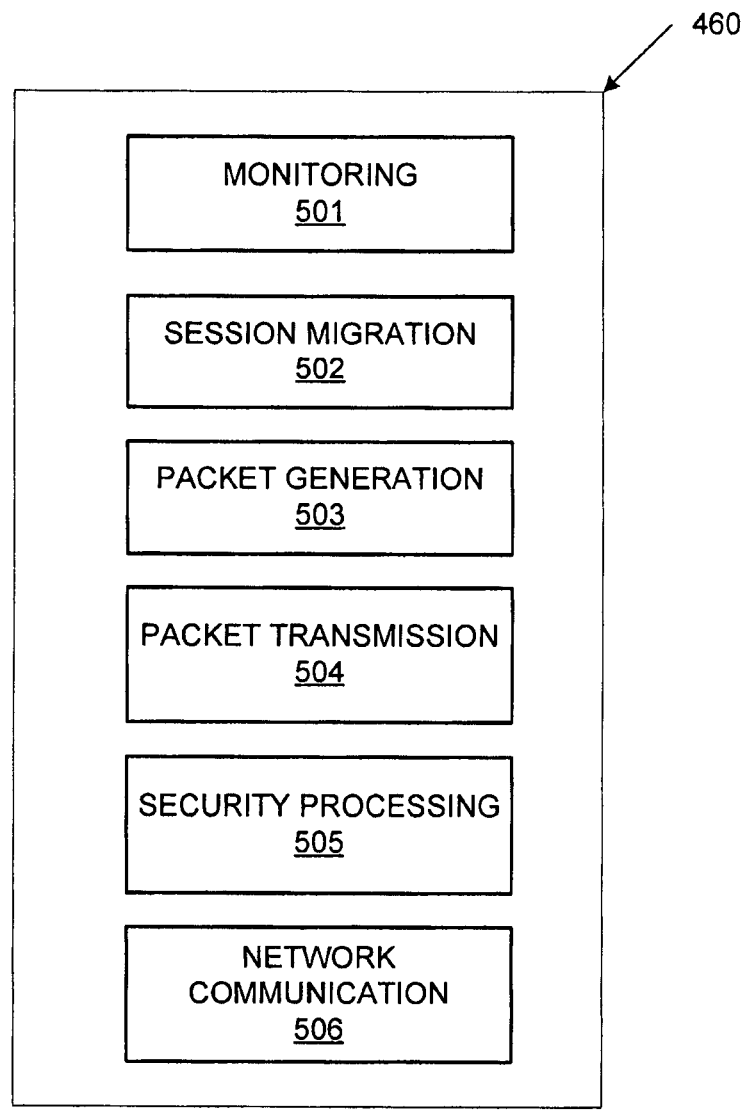
FIG. 5 illustrates a set of programs and data that is stored in memory of one embodiment of a security gateway.

FIG. 5 illustrates a set of code (e.g., programs) and data that is stored in memory of one embodiment of a security gateway, such as the security gateway set forth in FIG. 4. The security gateway uses the code, in conjunction with a processor, to implement the necessary operations (e.g., logic operations) to implement the described herein.

Referring to FIG. 5, the memory 460 includes a monitoring module 501 which when executed by a processor is responsible for performing traffic monitoring of traffic from the network or security gateways as described above. The memory also stores a session migration module 502 which, when executed by a processor, is responsible for migrating a session, including causing the sending of session information to another security gateway and the deletion of a session from its memory. The memory also stores a packet generation module 503 which, when executed by a processor, is responsible for generating packet with session information contained therein or with session information encapsulated therewith. Memory 460 also stores packet transmission module 504, which when executed by a processor causes a packet, such as, for example, the packet with session information, to be sent to a security gateway using, for example, network communications. Memory 460 also includes a security processing module 505 to perform security processing on packets that are part of the migrated session or other sessions. The memory also includes a network communication module 506 used for performing network communication and communication with the other devices (e.g., servers, clients, etc.).

Figure 6:
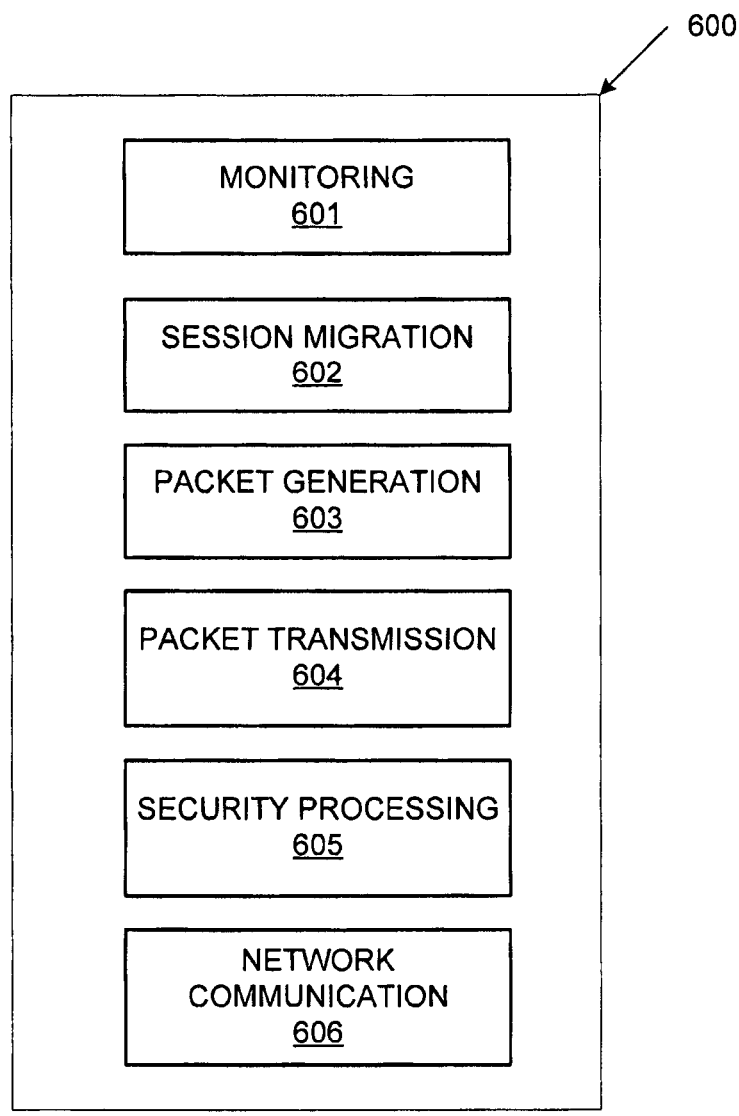
FIG. 6 illustrates a set of programs and data that is stored in memory of one embodiment of a server.

As described above, the security gateway in FIG. 1 that receives a session may be implemented using a computer system such as depicted in FIG. 4, except using different code to facilitate the receipt of a session from another security gateway. (Note that security gateways 101 and 102 may have code to both send and receive sessions being migrated.) The code is stored in computer-readable storage medium such as system memory 417, fixed disk 444, optical disk 442 or floppy disk 448. FIG. 6 illustrates a set of code (e.g., programs) and data that is stored in one of those memories. In one embodiment of the security gateway, such as implemented using the system shown in FIG. 4, the server uses the code, in conjunction with the processor, to implement the necessary operations to implement the discovery process depicted above, such as, for example, the operation set forth in FIG. 2.

Referring to FIG. 6, the memory 600 includes a monitoring module 601 which when executed by a processor is responsible for performing traffic monitoring of traffic from the network or security gateways as described above. The memory also stores a session migration module 602 which, when executed by a processor, is responsible for completing the migration of a session, including receiving session information from another security gateway and installing a session corresponding to the session information to perform security processing on packets in the session. The memory also stores a packet generation module 603 which, when executed by a processor, is responsible for generating a reply packet to confirm receipt of the session information, thereby indicating the security gateway is taking over the security processing of the session. Memory 460 also stores packet transmission module 604, which when executed by a processor causes a packet, such as, for example, the reply packet, to be sent to a security gateway using, for example, network communications. Memory 460 also includes a security processing module 605 to perform security processing on packets that are part of the migrated session or other sessions. The memory also includes a network communication module 606 used for performing network communication and communication with the other devices (e.g., servers, clients, etc.).

The advantages of embodiments of the present invention include, without limitation, enabling the portability of the network security among the network gateways at any time. In the event that a network gateway is under heavy system loads or has a failure of one or more of its interfaces, one can dynamically migrate the session information from one gateway to another gateway without disrupting network traffic. Using embodiments of the present invention, network security becomes a portable logical object that can be moved freely to optimize processing loading and increase network performance.

Once the sessions can be easily moved around the networks, it enables a programming interface that can dynamically change the network security posture and optimize how security is applied to the networks. One could use an API to program the network security by merely programming an application to optimize for the underlying network topology and achieve the maximum efficiency and flexibility. This results a virtualized network security and transform network security to be a service in the network.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving, at a first security gateway, session information for a network connection between a virtual machine and a first host machine of the first security gateway, the session information associated with a session corresponding to a network connection between the virtual machine and a second host machine of a second security gateway, wherein the second security gateway performs security processing for the network connection between the virtual machine and the second host machine during the session;
   receiving a packet associated with the session at the same time as receiving the session information;
   migrating the connection of the virtual machine from the second host machine to the first host machine using the session information, wherein the session information having been transferred from the second security gateway to the first security gateway in response to the virtual machine being transferred from the first host machine to the second host machine to maintain security processing for the session during migration of the connection, the first and second security gateways being separate physical devices; and
   thereafter performing security processing for the migrated connection of the session at the first security gateway.

2. The method defined in claim 1 wherein the session information is included within the packet.

3. The method defined in claim 2 wherein the session information is prepended or appended to a payload of the packet.

4. The method defined in claim 2 wherein the packet and the session information are encapsulated with a new protocol header.

5. The method defined in claim 1 wherein the session information comprises run-time states and metadata about the network connection associated with the session.

6. The method defined in claim 1 wherein the session information is used by the first security gateway to apply a security policy to the network connection.

7. The method defined in claim 1 further comprising storing, by the first security gateway, the session in a memory local to the first security gateway.

8. The method defined in claim 1 further comprising:
establishing a second network connection between the first and second security gateways, wherein the session information is received by the first security gateway over the second network connection; and
sending a confirmation to the second security gateway through the second network connection, the confirmation indicating that the first security gateway has received and taken over the session.

9. A computer-readable non-transitory storage medium having instructions stored therein, which when executed by a computer, cause the computer to perform a method, the method comprising:
receiving, at a first security gateway, session information for a network connection between a virtual machine and a first host machine of the first security gateway, the session information associated with a session corresponding to a network connection between the virtual machine and a second host machine of a second security gateway, wherein the second security gateway performs security processing for the network connection between the virtual machine and the second host machine during the session;
receiving a packet associated with the session at the same time as receiving the session information;
migrating the connection of the virtual machine from the second host machine to the first host machine using the session information, wherein the session information having been transferred from the second security gateway to the first security gateway in response to the virtual machine being transferred from the first host machine to the second host machine to maintain security processing for the session during migration of the connection, the first and second security gateways being separate physical devices; and
thereafter performing security processing for the migrated connection of the session at the first security gateway.

10. A security gateway device, comprising:
an ingress interface;
an egress interface; and
a security processing module coupled to the ingress and egress interfaces, the security processing module comprising a session transfer module to receive session information for a network connection between a first host machine of the security gateway and a virtual machine, the session information associated with a session corresponding to a network connection between the virtual machine and a second host machine of the another security gateway, wherein the another security gateway performs security processing for the network connection between the virtual machine and the second host machine during the session, receive a packet associated with the session at the same time as receiving the session information, and
migrate the connection of the virtual machine from the second host machine to the first host machine using the session information, the security processing module thereafter performing security processing for the migrated connection of the session, wherein the session information having been transferred from the another security gateway to the security gateway in response to the virtual machine being transferred from the first host machine to the second host machine.

11. The gateway defined in claim 10 wherein the session information is included within the packet.

12. The gateway defined in claim 11 wherein the session information is prepended or appended to a payload of the packet.

13. The gateway defined in claim 11 wherein the packet and the session information are encapsulated with a new protocol header.

14. The gateway defined in claim 10 wherein the session information comprises run-time states and metadata about the network connection associated with the session.

15. The gateway defined in claim 10 wherein the session information is used by the security processing module to apply a security policy to the network connection.

16. The gateway defined in claim 10 wherein the session transfer module is operable to install the session in a memory local to the security gateway.

17. The gateway defined in claim 10 wherein the session transfer module is operable to:
establish a second network connection between the security gateway and the another gateway, wherein the session information is received over the second network connection; and
send a confirmation to the another gateway through the second network connection, the confirmation indicating the security gateway has received and taken over the session.

18. The computer-readable non-transitory storage medium of claim 9 further comprising:
establishing a second network connection between the first and second security gateways, wherein the session information is received by the first security gateway over the second network connection; and
sending a confirmation to the second security gateway through the second network connection, the confirmation indicating that the first security gateway has received and taken over the session.

19. The computer-readable non-transitory storage medium of claim 9 wherein the session information comprises run-time states and metadata about the network connection associated with the session.

20. The computer-readable non-transitory storage medium of claim 9 wherein the session information is used by the first security gateway to apply a security policy to the network connection.

* * * * *